United States Patent
Kornhaas

(10) Patent No.: US 9,623,818 B2
(45) Date of Patent: Apr. 18, 2017

(54) SENSOR SYSTEM FOR AN ELECTRIC/ELECTRONIC ARCHITECTURE AND ASSOCIATED ELECTRIC/ELECTRONIC ARCHITECTURE FOR A VEHICLE

(71) Applicant: Robert Bosch GmbH, Stuttgart (DE)

(72) Inventor: Robert Kornhaas, Spraitbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/408,171

(22) PCT Filed: May 15, 2013

(86) PCT No.: PCT/EP2013/060001
§ 371 (c)(1),
(2) Date: Dec. 15, 2014

(87) PCT Pub. No.: WO2013/185999
PCT Pub. Date: Dec. 19, 2013

(65) Prior Publication Data
US 2015/0151694 A1 Jun. 4, 2015

(30) Foreign Application Priority Data
Jun. 15, 2012 (DE) .................. 10 2012 210 106

(51) Int. Cl.
*B60R 16/03* (2006.01)
*G06F 13/40* (2006.01)
*H04L 12/40* (2006.01)

(52) U.S. Cl.
CPC .......... *B60R 16/03* (2013.01); *G06F 13/4027* (2013.01); *H04L 12/40189* (2013.01); *H04L 2012/40273* (2013.01)

(58) Field of Classification Search
None
See application file for complete search history.

(56) References Cited

U.S. PATENT DOCUMENTS 4,250,547 A * 2/1981 Matsumoto .................. 710/305
5,372,411 A * 12/1994 Gerstenmaier et al. ...... 303/182
5,834,949 A * 11/1998 Oba .............................. 326/86
(Continued)

FOREIGN PATENT DOCUMENTS

CN 101293350 A 10/2008
EP 1251432 10/2002
(Continued)

OTHER PUBLICATIONS

International Search Report for PCT/EP2013/060001, issued on Sep. 12, 2013.

*Primary Examiner* — John R Olszewski
*Assistant Examiner* — Navid Ziaeianmehdizadeh
(74) *Attorney, Agent, or Firm* — Gerard Messina

(57) ABSTRACT

A sensor system for an electric/electronic architecture in a vehicle, having at least one sensor module for capturing at least one physical variable and at least one first interface for communication with a first bus system, and to an associated electric/electronic architecture for a vehicle. At least one second interface for communication with a second bus system is present, data of the at least one sensor module being able to be output via both bus systems.

12 Claims, 1 Drawing Sheet

(56) References Cited

U.S. PATENT DOCUMENTS

| | | | |
|---|---|---|---|
| 6,823,251 B1* | 11/2004 | Giers | 701/76 |
| 7,315,094 B2* | 1/2008 | Runge et al. | 307/9.1 |
| 8,392,084 B2 | 3/2013 | Skiles | |
| 8,571,044 B2* | 10/2013 | Ihle et al. | 370/401 |
| 2002/0161960 A1 | 10/2002 | Bahren | |
| 2002/0174291 A1* | 11/2002 | Hsu et al. | 711/105 |
| 2003/0055550 A1* | 3/2003 | Lohberg | B60T 8/171 701/71 |
| 2004/0162653 A1* | 8/2004 | Ban et al. | 701/35 |
| 2005/0209756 A1* | 9/2005 | Ueno | 701/45 |
| 2007/0000711 A1* | 1/2007 | Yamaguchi et al. | 180/274 |
| 2007/0024037 A1* | 2/2007 | Ueno | 280/735 |
| 2007/0233919 A1* | 10/2007 | Miura | H04L 12/40013 710/110 |
| 2009/0216408 A1* | 8/2009 | Ueno | 701/45 |
| 2009/0292841 A1* | 11/2009 | Weser et al. | 710/106 |
| 2012/0042109 A1* | 2/2012 | Schier et al. | 710/305 |
| 2012/0059562 A1* | 3/2012 | Skiles | 701/69 |
| 2012/0203413 A1* | 8/2012 | Eisele et al. | 701/22 |
| 2012/0226965 A1* | 9/2012 | Hammerschmidt | H03M 13/093 714/807 |
| 2012/0245780 A1* | 9/2012 | Eisele et al. | 701/22 |

FOREIGN PATENT DOCUMENTS

| | | |
|---|---|---|
| JP | 2003-152762 A | 5/2003 |
| JP | 2004-519383 A | 7/2004 |
| JP | 2004328488 A | 11/2004 |
| JP | 2005509557 A | 4/2005 |
| JP | 2008505012 A | 2/2008 |
| JP | 2008259025 A | 10/2008 |
| JP | 2010027062 A | 2/2010 |
| WO | WO02/092395 | 11/2002 |

* cited by examiner

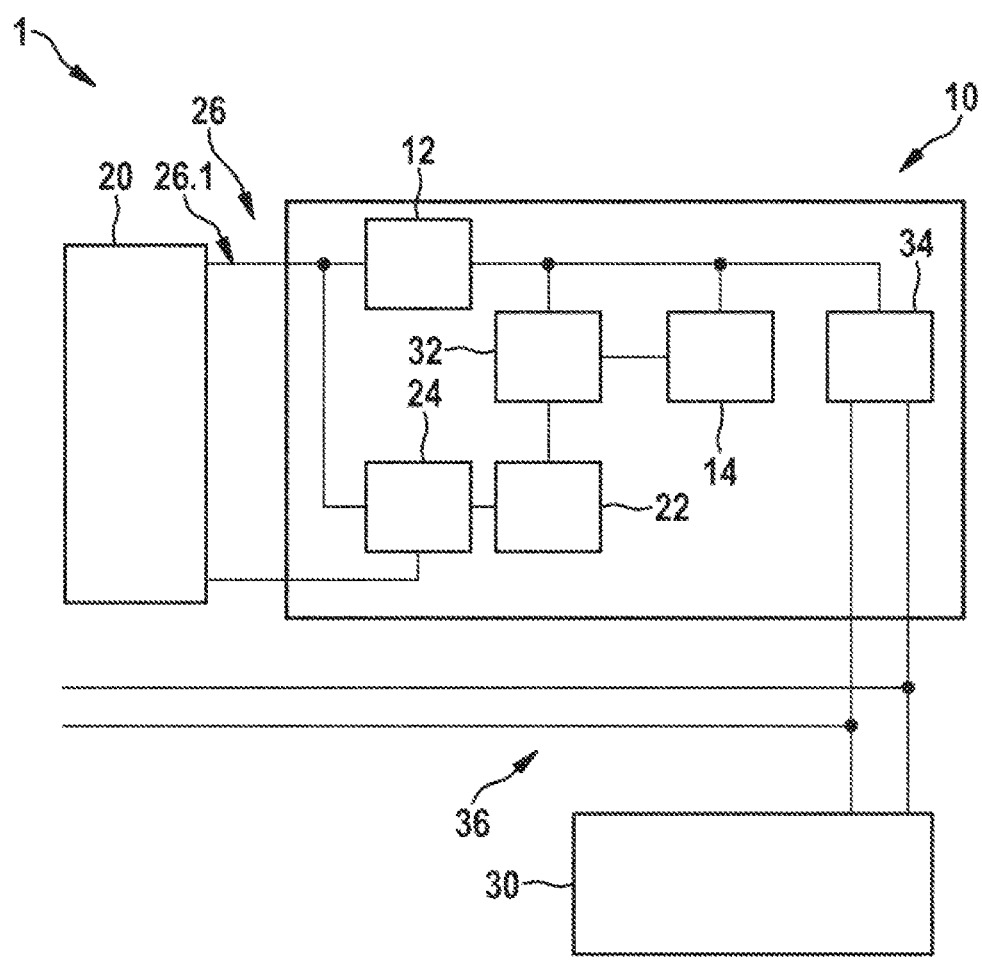

SENSOR SYSTEM FOR AN ELECTRIC/ELECTRONIC ARCHITECTURE AND ASSOCIATED ELECTRIC/ELECTRONIC ARCHITECTURE FOR A VEHICLE

FIELD OF THE INVENTION

The present invention relates to a sensor system for an electric/electronic architecture in a vehicle and an associated electric/electronic architecture for a vehicle.

BACKGROUND INFORMATION

Current electric/electronic architectures have a CAN connection between a sensor cluster or a sensor system and an ESP control unit (ESP: Electronic Stability Program). This means that all users on the CAN bus are in a position to receive directly data or information from the sensor cluster. New electric/electronic architectures having a sensor cluster, which is either integrated into the ESP control unit or an air bag control unit, have the disadvantage that there is no longer a direct connection between the sensor cluster and other users, but rather that all signals, depending on the integration location, first have to be routed via the ESP control unit or the air bag control unit. In addition, in the case of an integration of the sensor cluster into the air bag control unit, the disadvantage comes up that the air bag control unit is location-bound for an additional reason beside the central sensor system for the plausibilization of a triggering decision. This means that the air bag control unit is not able to be "freely" installed in the vehicle and consequently occupies a location in the vehicle which is close to the driver and is thus predestined for operating systems and comfort systems.

SUMMARY

By contrast, the sensor system according to the present invention for an electric/electronic architecture, and the associated electric/electronic architecture for a vehicle have the advantage that the communication of all messages in the form of information and data of the at least one sensor module is able to take place simultaneously on two different bus systems, so that the information and data of the at least one sensor module are available to all users of the first bus system and all users of the second bus system.

Specific embodiments of the sensor system, according to the present invention, for an electric/electronic architecture advantageously have low latency between sensing, i.e. capturing the physical variable, and message transmission, i.e. transmission of the associated information and data.

In specific embodiments of the electric/electronic architecture according to the present invention, having an air bag control unit and an ESP control unit (ESP: Electronic Stability program), an ESP control unit may continue to be used that has already been used, having a CAN interface. Information and data of an ESP sensor module and of an air bag sensor module are advantageously available to all CAN bus users. In addition, in specific embodiments of the electric/electronic architecture according to the present invention, no delay of the messages comes about by the routing via the air bag control unit or the ESP control unit. In addition, there advantageously comes about only a slight organizational coupling of the air bag function and the EPS function.

Furthermore, the specific embodiments of the present invention make possible a free selection of the installations of the individual components of the electric/electronic architecture according to the present invention. Because of that, the installation locations may be selected in an advantageous manner under the aspects of low space requirements of the fixed location components with regard to the air bag function and the ESP function, low wiring expenditure and mechanics expenditure. Thus, in particular, the air bag control unit is able to be freely placed in the vehicle without taking into consideration the installment position of the sensor system and the central sensor system.

Specific embodiments of the present invention make available a sensor system for an electric/electronic architecture in a vehicle, which includes at least one sensor module for capturing at least one physical variable and at least one first interface for communication with a first bus system. According to the present invention, at least one second interface for communication with a second bus system is provided, data of the at least one sensor module being able to be output via both bus systems.

Furthermore, an electric/electronic architecture is proposed for a vehicle having a first control unit, a second control unit and a sensor system according to the present invention.

It is particularly advantageous that a first sensor module and a second sensor module for capturing at least one physical variable are able to be provided. Because of that, data of the first sensor module may advantageously be evaluated for checking the plausibility of data of the second sensor module, and vice versa.

In one advantageous embodiment of the sensor system according to the present invention, a supply line is able to supply the first interface and the first sensor module and a voltage regulator with energy. In addition, the voltage regulator is able to supply the second interface and the second sensor module with energy. Thereby, the supply of two separate communication bus systems is advantageously enabled via a communication line, so that connecting pins may be saved in specific embodiments of the sensor system according to the present invention.

In a further advantageous embodiment of the sensor system according to the present invention, the first bus system may be developed as a PSI5 bus system and the second bus system may be developed as a CAN bus system. In the case of the first bus system developed as a PSI5 bus system, a line may be developed as a supply line.

In an advantageous embodiment of the electric/electronic architecture according to the present invention, the first control unit is able to communicate with the sensor system via the first bus system and the second control unit is able to communicate with the sensor system via the second bus system. The first control unit may be developed as an air bag control unit, for example, and the second control unit as an ESP control unit, for example.

In carrying out the first bus system as a PSI5 bus system and the second bus system as a CAN bus system, one may connect the supply of the voltage regulator for a microcontroller to a plus line of the PSI5 bus system, so that the PSI5 bus system directly supplies a first interface developed as a PSI5 interface and the voltage regulator and indirectly a first sensor module, which is developed as an air bag sensor module. The first bus system, developed as a PSI5 bus system, supplies the microcontroller, the second interface and a second sensor module developed as an ESP sensor module indirectly via the voltage regulator. This means that only four connecting pins and one connecting cable are required for the sensor system for specific embodiments of the electric/electronic architecture according to the present invention, but in spite of that, advantageously the full communication capability is possible on two different bus systems (CAN, PSI5).

An exemplary embodiment of the present invention is depicted in the drawing and explained in greater detail in the description that follows.

BRIEF DESCRIPTION OF THE DRAWING

The FIGURE shows a schematic block diagram of an exemplary embodiment of an electronic architecture according to the present invention, particularly for a vehicle.

DETAILED DESCRIPTION

As may be seen in the FIGURE, the exemplary embodiment shown of an electric/electronic architecture 1 according to the present invention includes a sensor system 10, a first control unit 20 and a second control unit 30.

As may further be seen in the FIGURE, sensor system 10 according to the present invention includes at least one sensor module 22, 32 for capturing at least one physical variable and at least one first interface 24 for communication with a first bus system 26. According to the present invention, at least one second interface 34 for communication with a second bus system 36 is provided, data of the at least one sensor module 22, 32 being output via both bus systems 26, 36.

In the exemplary embodiment shown, first control unit 20 is developed as an air bag control unit, and second control unit 30 as an ESP control unit. In this connection, first control unit 20 communicates with sensor system 10 via first bus system 26, and second control unit 30 communicates with the sensor system via second bus system 36. In the exemplary embodiment shown, first bus system 26 is developed as a PSI5 bus system and second bus system 36 is developed as a CAN bus system.

As may further be seen from the FIGURE, the exemplary embodiment shown of sensor system 10, according to the present invention, includes a first sensor module 22 for capturing at least one physical variable for air bag control unit 20 and a second sensor module 32, for capturing at least one physical variable for ESP control unit 30.

Consequently, the exemplary embodiment shown of sensor system 10 according to the present invention includes all the modules required, for the air bag function and the ESP function, for sensing and outputting the required values, such as sensor module 22, PSI5 interface 24, ESP sensor module 32, CAN interface 34, as well as a voltage regulator 12 and a microcontroller 14 for processing and/or evaluating the information and data and for controlling the functions of sensor system 10. The supply of voltage regulator 12 for microcontroller 14 is connected to a positive wire 26.1 of PSI5 bus system 26, i.e. the PSI5 bus system takes over the energy supply of the PSI5 communication or rather PSI5 interface 24 and of voltage regulator 12, and thus, indirectly, the energy supply of air bag sensor module 22, of microcontroller 14, of CAN interface 34 and of ESP sensor module 32. This means that for the exemplary embodiment shown of sensor system 10, only four connecting pins and one connecting cable are required, and in spite of that, the full communication capability is possible on two different bus systems 26, 36 (CAN, PSI5). Moreover, by the connection of the two sensor module 22, 32, a mutual plausibility check of the at least one captured physical variable may be carried out and/or messages may be sent to the other bus system 26, 36.

In the exemplary embodiment shown, the communication with air bag control unit 20 takes place using the PSI5 protocol, and the communication with ESP control unit 30 takes place using the CAN protocol. Additional users may be connected to bus system 26, 36. Because of the measures described above with the coupling of sensor modules 22, 32, in both bus systems, all information and data of air bag sensor module 22 and of the ESP sensor module are able to be received and do not have to be routed.

What is claimed is:

1. A sensor system for an electronic architecture in a vehicle, comprising:
    at least one sensor module for capturing at least one physical variable;
    at least one first interface of the sensor system connected to the at least one sensor module and to a first bus system for communication with the first bus system; and
    at least one second interface of the sensor system connected to the at least one sensor module and to a second bus system for communication with the second bus system, wherein data of the at least one sensor module is able to be output via the first and second bus systems, wherein the data of the at least one sensor module is not routed via a control unit when output via the first and second bus systems.

2. The sensor system as recited in claim 1, wherein the at least one sensor module includes a first sensor module and a second sensor module for capturing the at least one physical variable.

3. The sensor system as recited in claim 2, wherein data of the first sensor module are able to be evaluated for a plausibility check of data of the second sensor module based on a comparison of the data of the first and second sensor modules, and wherein the data of the second sensor module are able to be evaluated for a plausibility check of the data of the first sensor module based on a comparison of the data of the first and second sensor modules.

4. The sensor system as recited in claim 2, wherein a supply line supplies the first interface, the first sensor module, and a voltage regulator with energy.

5. The sensor system as recited in claim 4, wherein the voltage regulator supplies the second interface and the second sensor module with energy.

6. The sensor system as recited in claim 1, wherein the first bus system includes a PSI5 bus system, and wherein the second bus system includes a CAN bus system.

7. The sensor system as recited in claim 6, wherein a line of the first bus system includes a supply line.

8. An electronic architecture for a vehicle, comprising:
    a first control unit;
    a second control unit; and
    a sensor system, the first and second control units communicating with the sensor system via at least one bus system, wherein the sensor system includes:
        at least one sensor module for capturing at least one physical variable,
        at least one first interface of the sensor system connected to the at least one sensor module and to a first bus system for communication with the first bus system, and
        at least one second interface of the sensor system connected to the at least one sensor module and to a second bus system for communication with the second bus system, wherein data of the at least one sensor module is able to be output via the first and second bus systems, wherein the data of the at least one sensor module is not routed via a control unit when output via the first and second bus systems.

9. The electronic architecture as recited in claim 8, wherein the first control unit communicates with the sensor system via the first bus system, and wherein the second control unit communicates with the sensor system via the second bus system.

10. The electronic architecture as recited in claim 9, wherein the first control unit includes an air bag control unit, and wherein the second control unit includes an electronic stability program control unit.

11. The sensor system as recited in claim 1, wherein:
the first sensor module includes a first signal line connection to the first interface,
the second sensor module includes a first signal line connection to the second interface and a second signal, and
the first sensor module and the second sensor module share a second signal line connection that connects the first and second sensor modules to each other.

12. The electronic architecture as recited in claim 8, wherein:
the first sensor module includes a first signal line connection to the first interface,
the second sensor module includes a first signal line connection to the second interface and a second signal, and
the first sensor module and the second sensor module share a second signal line connection that connects the first and second sensor modules to each other.

* * * * *